United States Patent Office 3,464,681
Patented Sept. 2, 1969

3,464,681
CHARGE CONVEYING DEVICE FOR HIGH TEMPERATURE INDUSTRIAL OVENS
Vanfrido Olivotto, 85 Via Carlo Capelli, Turin, Italy
Filed Apr. 16, 1968, Ser. No. 721,639
Claims priority, application Italy, Mar. 5, 1968, 50,785/68
Int. Cl. F27b 9/20
U.S. Cl. 263—6                                                7 Claims

ABSTRACT OF THE DISCLOSURE

A metal block or a solid charge-carrier is conveyed in an oven by means of rolls rotatable in troughs extending throughout the effective length of the rolls, the rolls and possibly the troughs being made of a heat-refractory ferrous alloy containing at least 6 wt. percent chrome. Helical grooves are advantageously formed in the rolls to wipe-off from the troughs any deposits of foreign matter.

FIELD OF THE INVENTION

The invention relates to industrial ovens operating at high temperatures, typically above 800° C. and even above 1,000° C., for a serial, high-temperature treatment of articles such as metal ingots, metal parts, sintered metal mouldings and many others.

More particlarly, the invention relates to ovens as above, comprising a horizontally elongated heating chamber and means permanently arranged in the chamber for conveying ingots or other solid objects (e.g. trays or cases in which the articles to be treated are disposed) through said chamber from the inlet to the outlet end of the oven.

The problem of conveying heavy solid charges through an oven chamber operating at a temperature as high as 1,000° C. has been and still is difficult to solve, as far as the materials and structure of the components of the conveying system are concerned, both because metallic materials drastically lose their mechanical properties when heated at such an elevated temperature and, therefore, do not offer sufficient reliability, and because refractory materials do not satisfactorily withstand tensile stresses and abrasion.

Thus, it is an object of this invention to provide, in a high-temperature industrial oven, a charge-conveying arrangement wherein the drawbacks just pointed out above are substantially reduced in a surprisingly simple manner.

A further object of the invention is to provide the said charge-conveying arrangement which is accurate and durable in operation and is not subject to wear and jamming. A still further object of the invention is to provide said charge-conveying arrangement requiring but limited maintenance even under severe operating conditions of the oven. A further object of the invention is to provide the said charge-conveying arrangement not requiring internal cooling of the charge-conveying members. Further objects and advantages of the invention will result from the following description.

DESCRIPTION OF THE INVENTION

The invention essentially relies upon the discovery that, notwithstanding a high temperature of 800°–1,000° C. (or even higher) in the oven, substantial charges may be conveyed by means of a system of ferrous alloy rolls, provided each of said rolls is rotatably supported over its entire effective length by means of a stationary trough member, and provided at least the roll surface (but preferably also the trough surface) has incorporated therein a sufficient amount of chrome oxides (mainly $Cr_2O_3$). The invention further relies upon the discovery that the necessary amount chrome oxides is generated in situ and is self-replenishable by making said rolls and, optionally, trough members of a ferrous alloy containing a sufficient proportion chrome metal alloyed therein; at the high temperature prevailing in the oven, the chrome component of the alloy at the surface of the rolls and trough members is readily converted to oxide, which is extremely stable even in the presence of 10–12% reducing gases in the oven atmosphere and imparts self-lubricating properties to the interengaging surfaces of the rolls and troughs. To that end, a minimum of about 6 wt. percent chrome in the alloy has been found to be necessary. Preferably, heat-refractory ferrous alloys containing 15%–25% by weight chrome are used. Excellent materials are provided by austenitic chrome-nickel steels such as AISI 330 or AISI 310 chrome-nickel steels.

Thus, the invention provides, in a high-temperature oven, a charge-conveying system comprising a plurality of mutually parallel charge-conveying rolls extending transversely of the heating chamber in the oven, a plurality of trough-shaped supports associated with their respective rolls in an arrangement wherein each of the rolls is rotatably supported by its associated trough support over the entire effective length of the roll, at least said rolls being made of a heat-refractory ferrous alloy containing at least 6 wt. percent chrome; and means for simultaneously rotating the rolls in their trough supports from the outside of the oven.

Figure 1:
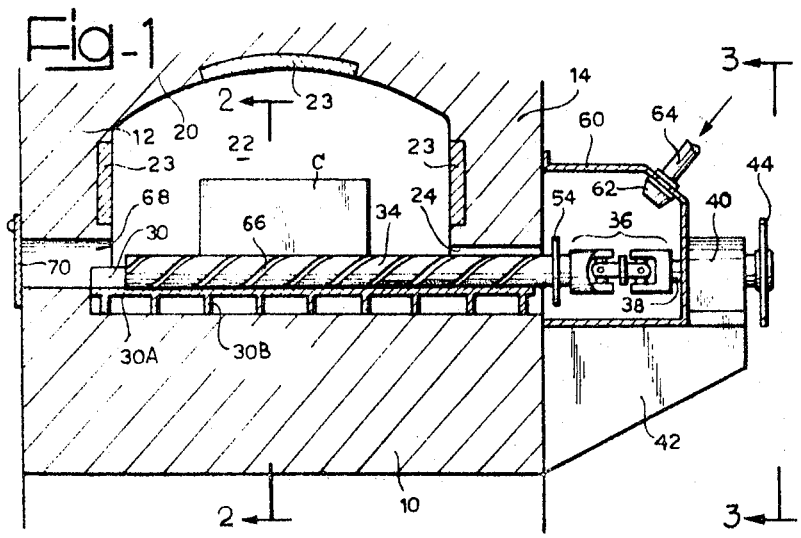
FIGURE 1 is a cross-sectional view of an embodiment of this invention.
Figure 2:
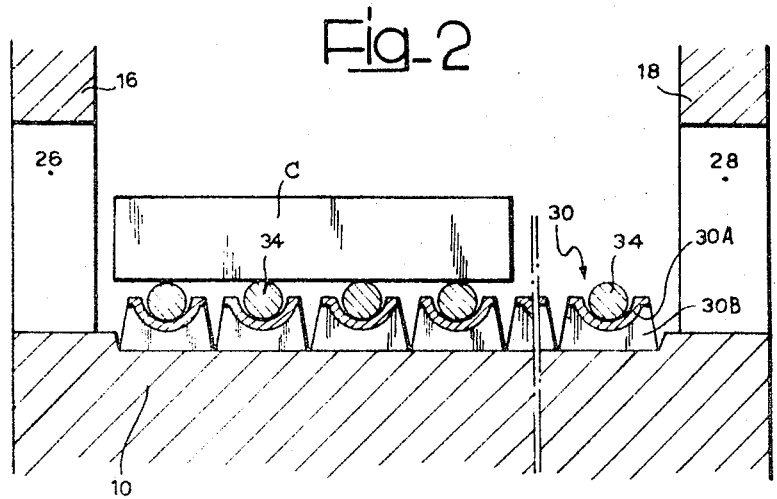
FIGURE 2 is a longitudinal sectional view according to line 2—2 of FIG. 1.
Figure 3:
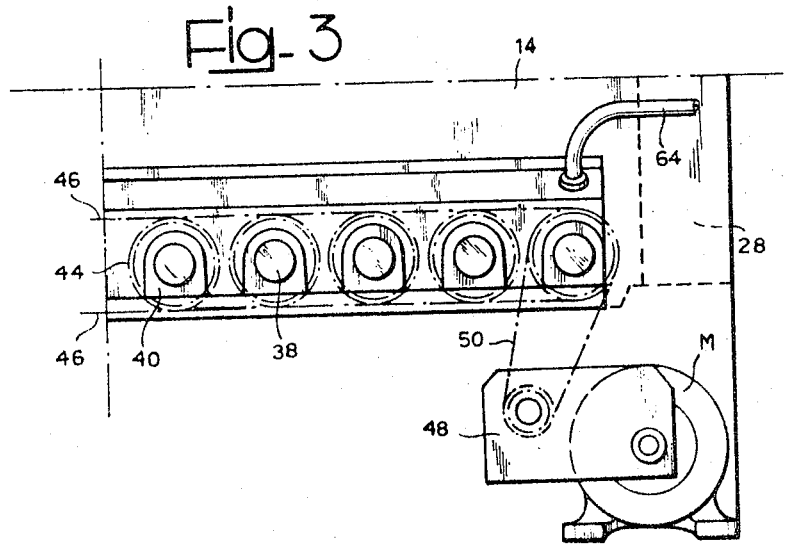
FIGURE 3 is a fragmentary elevational view on line 3—3 of FIG. 1.

The oven shown in FIGS. 1–3 comprises a refractory hearth 10, a pair of longitudinal side walls 12, 14, a pair of end walls 16, 18, and a vault 20, all of refractory material, defining a horizontally elongated heating chamber 22 equipped with heating means 23 of conventional character, capable of establishing in a part, at least, of the chamber 22 a temperature of at least 800° C. An inlet aperture 26 is formed in the end wall 16 and an outlet aperture 28 is formed in the opposite end wall 18 for loading and unloading the articles into and from the oven, respectively.

A series of elongated, mutually parallel support members 30 is placed on the hearth 10. The members 30 consist of castings of AISI 310 steel, comprising a rigid trough section 30A integrally formed with a plurality of supporting webs 30B arranged transversely to the length of the trough section. Each of the support members 30 extends across the whole width of the heating chamber 22 and into an aperture 24 in the side wall 14. The cross-sectional profile of the concave face of the trough sections 30A advantageously consist of an arc of circle; however, arcs of other geometrical curves may be adopted.

Each of the trough sections 30A accommodates a cylindrical roll 34 machined from AISI 310 steel, extending across the effective width of the heating chamber 22 and protruding outwardly through its associated aperture 24 in the side wall 14. The rolls 34 are rotatable in the trough sections 30A in frictional contact therewith and are effectively supported by said sections over the whole effective length of the rolls, that is over (and possibly beyond) the length comprised within the width of the chamber 22. However, the diameter of the rolls 34 is appreciably smaller (typically by about 5–10%) than the diameter of the concave face of their associated troughs, so that the rolls are self-adjustable in the trough at the high-temperature conditions in the oven.

The outwardly protruding end of each of the rolls 34 is coupled by means of a double cardan joint 36 to a driving shaft 38, which is rotatable in a bearing assembly 40 in general alignment with its respective roll. The bearings 40 are rigidly supported by the oven structure by means of any convenient members, such as brackets 42. The double cardan joint 36 in the embodiment shown (or any other equivalent means in other possible embodiments) is used to permit its associated roll to self-accommodate in its trough section 30A, without imposing on the roll external forces opposing a full-length contact between the roll and trough. Each of the driving shafts 38 has a sprocket wheel 44 keyed to its outer end and all the sprocket wheels present are coupled together (FIG. 3) by means of a roller chain 46 for a co-current synchronous operation, the sprocket system being driven by an electric motor M through a (preferably variable) speed-reducing gearing 48 and a transmission chain 50.

Each of the rolls 34 (FIG. 1) has a disk 54 fitted thereon at a location between the double cardan joint 36 and the aperture 24 in the wall 14, providing a shield for screening the joint against heat radiation from the chamber 22 through the aperture 24. Moreover, according to an advantageous embodiment of the invention, particularly suited for ovens in which a special gaseous protective atmosphere is to be established and maintained in operation, the necessary gas or gaseous mixture is supplied in a manner providing for cooling the joints 36 and their driving shafts 38. In the embodiment shown, a hood 60 is applied to the wall 14 of the oven to disclose the outer ends of the rolls, the joints 36 and apertures 24 and cool blanket gas is supplied to the hood by means of nozzles 62 and gas conduits 64; in this manner the gas entering the hood cools the joints 36 and passes in pre-heated condition to the chamber 22 through the apertures 24.

In operation, the rolls 34 provide a planar rollway in the chamber 22, by means of which a charge C is conveyed lengthwise of the chamber. Similarly to the conventional practice, the charge C is to be of the "flat-bottomed" type, so that its weight will be evenly distributed on a plurality of rolls 34 and on each roll in said plurality. Metal ingots or slabs do not give rise to difficulties under this aspect. In the case of irregularly shaped articles, however, it is obviously advisable to use suitable carriers (trays, etc.) having a flat bottom. Of course, as is the case of all known high-temperature ovens, the load imposed on the rolls must not exceed predetermined safety values. Denoting by P the load imposed on a length $l$ of a roll having a diameter $d$, and by Q the own weight of said length $l$ of the roll, the charge-conveying device as described above typically admits specific loads $$\frac{P+Q}{l \times d}$$

up to about 1 kg./cm.$^2$; this is a surprisingly high value. The surface layer of chrome oxides, which spontaneously form on the rolls and troughs, impart self-lubricating properties to the interengaging surfaces and also provide on the rolls and troughs relatively tough, refractory "skins" which substantially contribute to both mechanical and thermal resistance of said parts. It is also to be pointed out that no oil- or water-cooling of the rolls is necessary in the system described.

In order to reduce wear to a minimum, each of the rolls 34 is advantageously formed with a continuous helical groove 66 on its outer surface; taking into account the direction of rotation of the rolls, the direction of the helix of the groove is such as to sweep-off any foreign particles from the trough towards the free end of the roll, i.e. towards the wall 12. The latter is formed, in alignment with each of the troughs, with an aperture 68 (normally closed by a cover 70) for periodical removal of the foreign matter.

In an oven constructed as described above, continuously operating at 1,150° C. with loads averaging 0.4–0.5 kg./cm.$^2$, no measurable wear of the rolls and troughs was found after one month operation. In order to keep the specific load values as low as possible, it is advisable to arrange the trough supports possibly adjacent to each other (see FIG. 2) thereby to increase the number of rolls simultaneously supporting the charge C at every moment.

Figure 6:
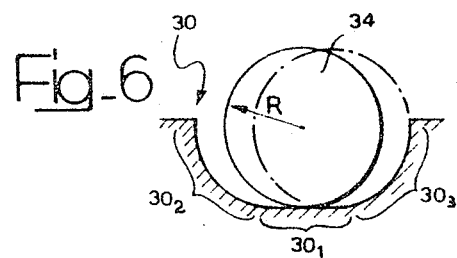
FIGURE 6 is a cross-sectional view showing a preferred profile of the trough surface supporting a roll.

The cross-sectional profile of the troughs is preferably designed as shown in FIG. 6, wherein the radius (half-diameter) of the roll 34 is denoted by R. The trough profile consists of a planar bottom section $30_1$ smoothly merging into arcuate flank sections $30_2$ and $30_3$, each of which is an arc of a circle of a radius equal to the radius R of the roll. In operation, the roll 34 self-accommodates in the position shown by dash-and-dot line in the figure, in which it contacts the trough surface over a substantially extended area whereby specific pressure and wear are advantageously reduced. The width of the planar bottom section $30_1$ preferably amounts to a fraction only, of the radius R, typically not exceeding R/3. The angular width of the arcuate flank sections $30_2$, $30_3$ typically is from 60° to 90°.

Figure 4:
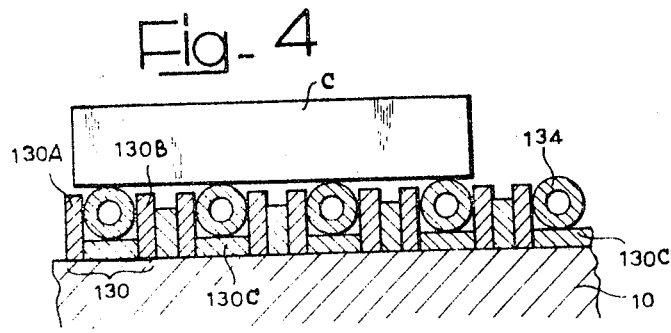
FIGURE 4 is a cross-sectional view similar to that of FIG. 2 showing a modification of the trough supports.

In the embodiment shown in FIG. 4, the rolls 134 are tubular and are supported by trough supports 130, each of which is built up of three unitary slabs of a hard heat-refractory material, such as carborundum, mullite and the like, namely a pair of lateral slabs 130$a$, 130$b$ and a bottom slab 130C. Such slabs may relatively easily be manufactured by a press-sintering process. The rolls 134 are of a chrome-nickel steel containing 25% chrome. In operation, the aforementioned tough "skin" of chrome oxides is formed not only on the outer surface of each of the rolls, but also on the inner surface thereof, thereby to better contribute to the mechanical resistance of the roll.

Figure 5:
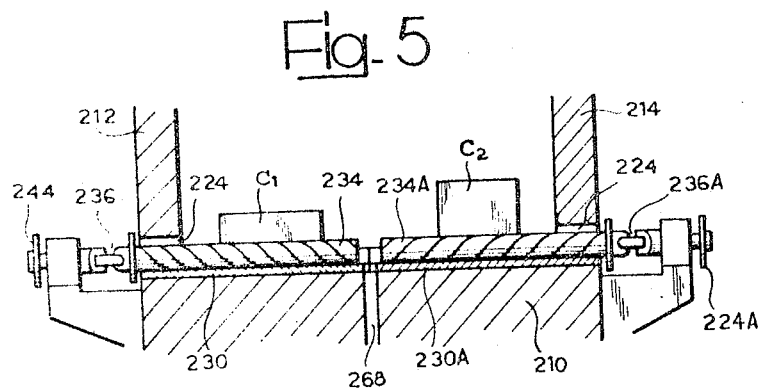
FIGURE 5 is a cross-sectional view of a double-path oven embodying the invention.

The oven shown in FIG. 5 still comprises a horizontal hearth 210 and a pair of longitudinal side walls 212, 214 with apertures 224 corresponding to the aperture 24 in FIG. 1. A double series of trough supports 230 and 230A is arranged in the oven on the hearth 210, each of the supports extending from its associated aperture 224 towards the mid-plane of the oven where the foreign particles are discharged from the supports into vertical discharge channels 268 in the hearth 210 accomplishing the function of the apertures 68 in FIG. 1. The rolls in the two series have their own drives, including double cardan joints 236, 236A and sprocket wheels 244, 244A respectively, arranged at the two longitudinal sides of the oven and powered by their own motor- and speed-reducer units (not shown) similar to that shown in FIG. 3. The two roll-ways so established in the oven may thus operate at different speeds, adjustable at will, depending upon the time-programs required by the specific charges $C_1$, $C_2$ conveyed by the roll-ways.

What I claim is:
1. In a high-temperature oven comprising a pair of longitudinal side walls, a horizontal hearth between the walls and a charge-conveying system on said hearth for conveying a solid charge through the oven, the said charge-conveying system comprising: a plurality of mutually parallel charge-conveying rolls extending transversely between said walls, a plurality of trough-shaped supports associated with their respective rolls in an arrangement wherein each of the rolls is rotatably supported by its associated trough support over the entire effective length of the roll, said rolls being made of a heat-refractory ferrous alloy containing at least 6% by weight chrome, and means for simultaneously rotating the rolls in their trough supports from the outside of the oven while allowing the rolls of being self-adjustable in their supports.

2. In the oven as claimed in claim 1, the said trough-shaped supports made of a heat-refractory ferrous alloy containing at least 6 wt. percent chrome.

3. In the oven as claimed in claim 1, the said alloy consisting of austenitic chrome-nickel steel containing 15–25 wt. percent alloyed chrome.

4. In the oven as claimed in claim 1, a helical groove in the surface of each roll, designed to sweep foreign particles from the trough-shaped support towards an end of the latter, and an evacuation aperture associated with said end to collect and evacuate said particles.

5. In the oven as claimed in claim 1, the said rolls of tubular form.

6. In the oven as claimed in claim 1, the last named means comprising, per each roll, a double cardan joint associated with the driven end of the roll.

7. In the oven as claimed in claim 1, the said rolls protruding to the outside of the oven through apertures in one of the side walls, external hood means enclosing the protruding ends of the rolls and the apertures, and conduit means for supplying a cool gaseous fluid to said hood means.

References Cited
UNITED STATES PATENTS

| | | |
|---|---|---|
| 1,205,690 | 11/1916 | Wetcke. |
| 1,593,351 | 7/1926 | Paige _____ 263—6 |
| 2,205,242 | 6/1940 | Davis et al. |
| 2,875,995 | 3/1959 | Troglione _____ 263—6 |
| 2,984,473 | 5/1961 | Ornitz et al. |

JOHN J. CAMBY, Primary Examiner